United States Patent
Deyrail et al.

(10) Patent No.: US 12,359,033 B2
(45) Date of Patent: Jul. 15, 2025

(54) METHOD FOR PREPARING AN IMPREGNATED FIBROUS MATERIAL BY REACTIVE PULTRUSION

(71) Applicant: Arkema France, Colombes (FR)

(72) Inventors: Yves Deyrail, Serquigny (FR); Gilles Hochstetter, Colombes (FR); Thomas Boucheres, Pierre-Benite (FR); Adrian Causier, Serquigny (FR)

(73) Assignee: ARKEMA FRANCE, Puteaux (FR)

( * ) Notice: Subject to any disclaimer, the term of this patent is extended or adjusted under 35 U.S.C. 154(b) by 748 days.

(21) Appl. No.: 17/624,653

(22) PCT Filed: Jul. 7, 2020

(86) PCT No.: PCT/FR2020/051202
§ 371 (c)(1),
(2) Date: Jan. 4, 2022

(87) PCT Pub. No.: WO2021/005302
PCT Pub. Date: Jan. 14, 2021

(65) Prior Publication Data
US 2022/0275157 A1 Sep. 1, 2022

(30) Foreign Application Priority Data
Jul. 9, 2019 (FR) ...................................... 1907685

(51) Int. Cl.
*C08J 5/24* (2006.01)
*B29C 70/52* (2006.01)
*B29K 77/00* (2006.01)

(52) U.S. Cl.
CPC ............. *C08J 5/244* (2021.05); *B29C 70/522* (2013.01); *B29C 70/523* (2013.01);
(Continued)

(58) Field of Classification Search
CPC .. C08J 5/244; C08J 5/245; C08J 5/246; B29C 70/52; B29C 70/523
See application file for complete search history.

(56) References Cited

U.S. PATENT DOCUMENTS 3,940,464 A 2/1976 Davis et al.
4,549,920 A * 10/1985 Cogswell .............. B29C 70/521
156/181
(Continued)

FOREIGN PATENT DOCUMENTS

EP    0425341 A1    5/1991
EP    0581641 A1    2/1994
(Continued)

OTHER PUBLICATIONS

Benzler, B., "Determination of the fiber content of composite materials by thermogravimetry", UserCom, Jan. 2001, pp. 7-8, vol. 13, Mettler Toledo, Giessen, Germany. (20 pages).
(Continued)

*Primary Examiner* — Robert C Boyle
(74) *Attorney, Agent, or Firm* — Boone IP Law

(57) ABSTRACT

A method for manufacturing at least one impregnated fibrous material including a fibrous material made of continuous fibers and at least one thermoplastic polymer, the method including a step of impregnating the at least one fibrous material in a pultrusion head by injecting a reactive composition in the melt state including at least one precursor of the thermoplastic polymer in the presence of the fibrous material, the at least one fibrous material on entry into the pultrusion head being divided in its thickness into layers, with each layer circulating in its own channel within the pultrusion head, the reactive composition being injected into each channel and/or between the layers when they are recombined at the exit from each channel, the channel being
(Continued)

heated, in which the precursors of the thermoplastic polymer are at least partly polymerized.

20 Claims, 3 Drawing Sheets

(52) U.S. Cl.
CPC ............... *B29C 70/526* (2013.01); *C08J 5/24* (2013.01); *B29K 2077/00* (2013.01); *C08J 2300/22* (2013.01); *C08J 2377/06* (2013.01)

(56) References Cited

U.S. PATENT DOCUMENTS

| | | | |
|---|---|---|---|
| 5,138,021 A | | 8/1992 | Judas et al. |
| 5,665,855 A | | 9/1997 | Acevedo et al. |
| 2007/0113983 A1 | * | 5/2007 | Brown ............... C08G 18/4804 156/441 |
| 2007/0227646 A1 | * | 10/2007 | Yano ..................... B29B 15/122 156/441 |
| 2019/0001593 A1 | * | 1/2019 | Cai ............................ C08J 5/10 |

FOREIGN PATENT DOCUMENTS

| | | |
|---|---|---|
| EP | 0581642 A1 | 2/1994 |
| EP | 0739924 A1 | 10/1996 |
| EP | 1505099 A2 | 2/2005 |
| WO | 2009045190 A1 | 4/2009 |
| WO | 2010130930 A1 | 11/2010 |
| WO | 2013086258 A1 | 6/2013 |
| WO | 2015121583 A2 | 8/2015 |

OTHER PUBLICATIONS

International Search Report (PCT/ISA/210) and Written Opinion (PCT/ISA/237) mailed on Oct. 20, 2020, by the European Patent Office as the International Searching Authority for International Application No. PCT/FR2020/051202. (14 pages).

Koubaa, S., et al., "Simple modelling of impregnation in pultrusion process of thermoplastic composites", International Journal of Microstructure and Materials Properties, Jan. 2012, pp. 428-438, Inderscience Enterprises Ltd. (12 pages).

* cited by examiner

[Fig. 1]
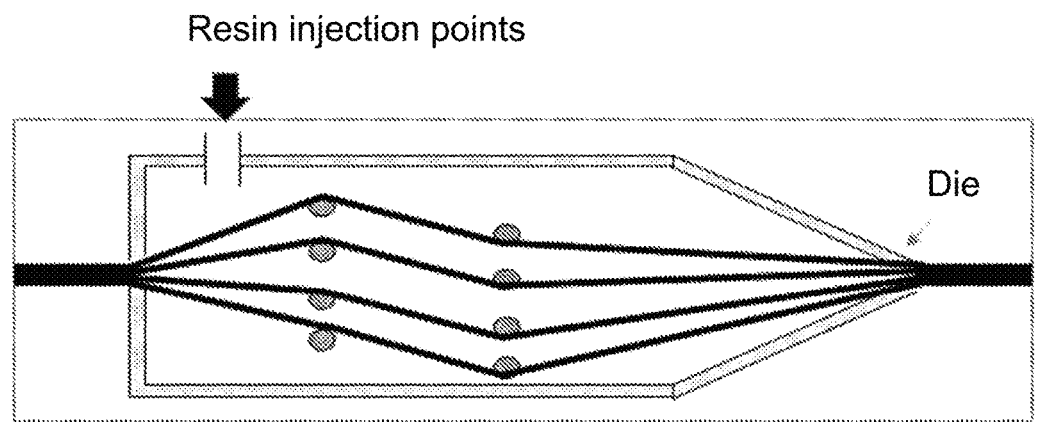
[Fig. 2]
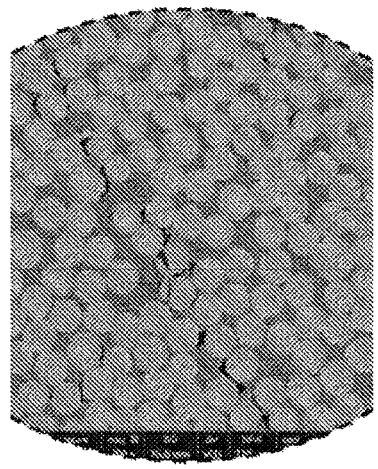
[Fig. 3]
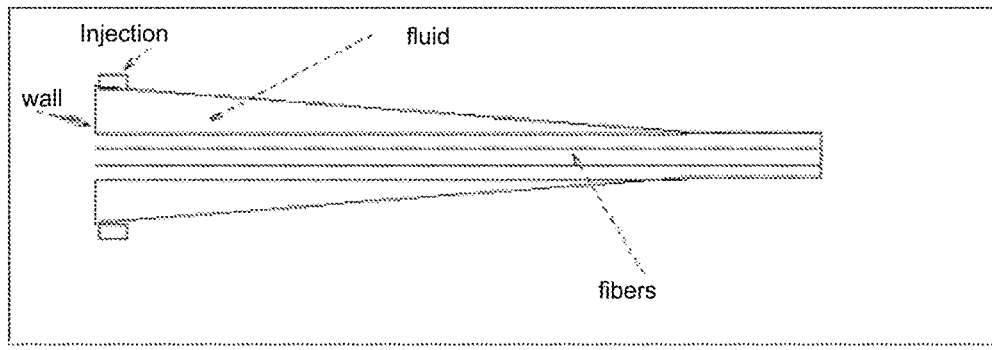

[Fig. 4]
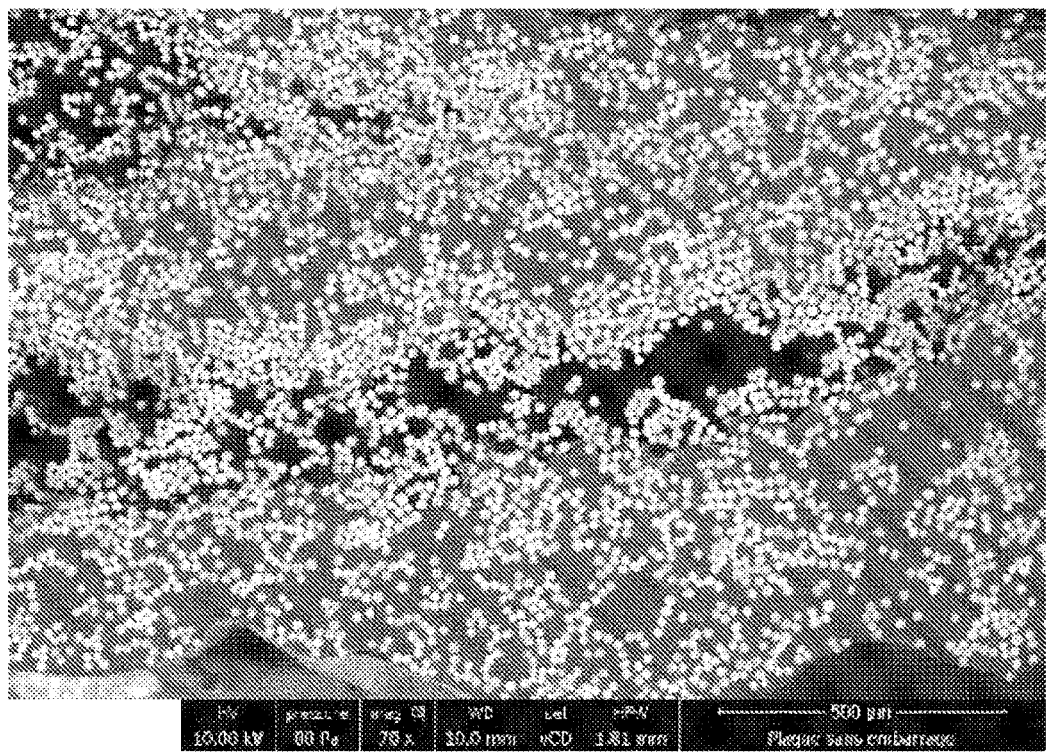
[Fig. 5]
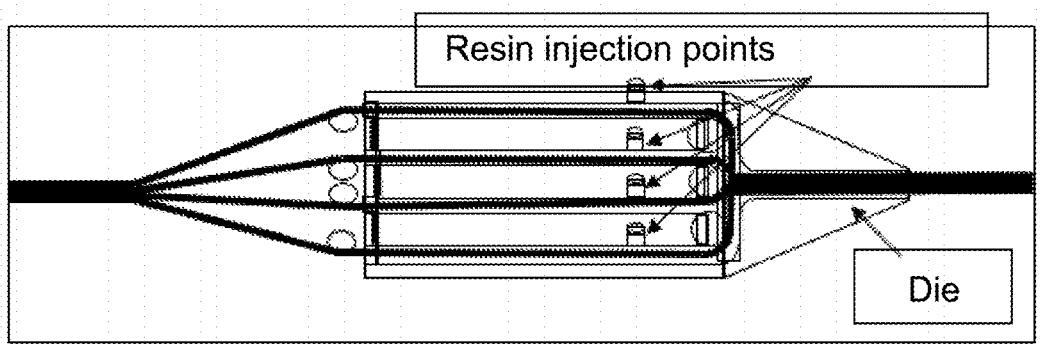

[Fig. 6]
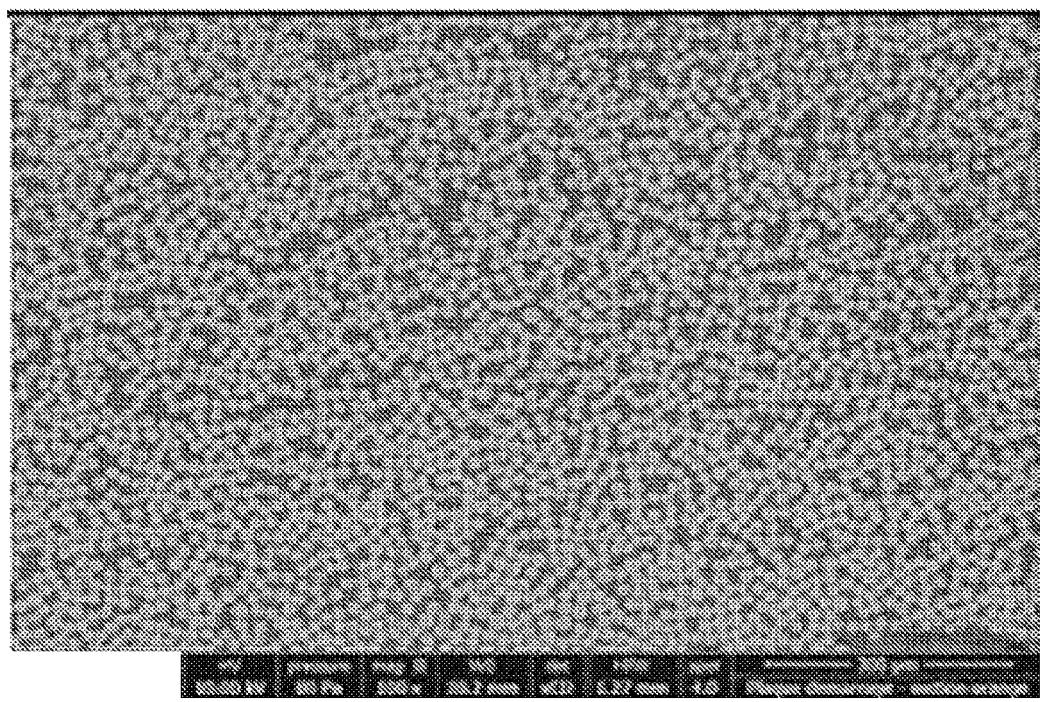
[Fig. 7]
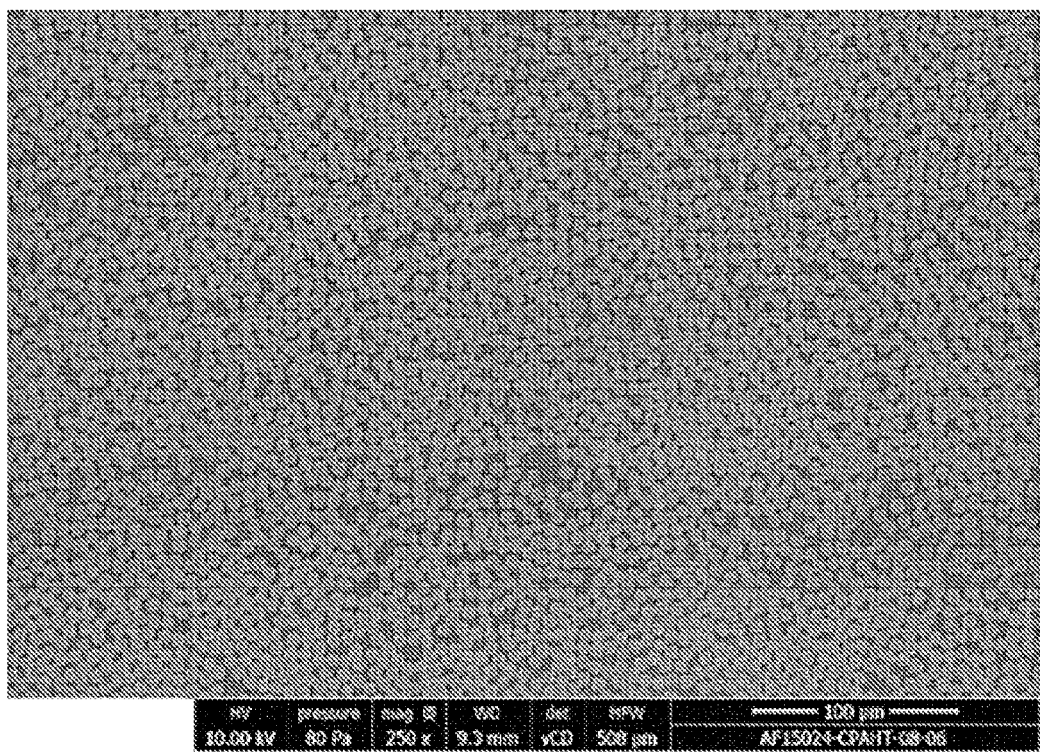

METHOD FOR PREPARING AN IMPREGNATED FIBROUS MATERIAL BY REACTIVE PULTRUSION

TECHNICAL FIELD

The present invention relates to a method of preparing a fibrous material impregnated with a thermoplastic polymer by reactive pultrusion, the ribbons obtained by the method and the use thereof.

PRIOR ART

In conventional thermoplastic pultrusion, the impregnation resin is a polymer with little or no reactivity and with a sufficiently low viscosity (<100 Pa·s) to be able to impregnate the fiber strands (rovings) at a line speed of from 0.2 to 1 m/min while keeping a reasonable head length so as to limit the friction surface on the rovings as well as the machining cost.

The impregnation of a roving can be characterized by a diffusion time of the resin to the core of the roving. This diffusion time depends on several factors, such as the viscosity of the thermoplastic polymer, the line speed and the thickness of the roving.

In impregnation techniques, the use of supporters is known to reduce the diffusion time of the resin through the roving and to make the fiber distribution uniform going from a roving with a circular cross-section to a rectangular cross-section with a very high width/thickness ratio (large width, small thickness).

This operation is done by making the roving circulate alternatively above and below a series of contact surfaces by applying tension on the roving. The supporters can be upstream of the die and/or inside the die. The upstream supporters serve to spread the roving and the supporters inside the die allow a roving/solid contact zone to be generated.

Thus, international application WO2013086258 describes the impregnation of a fibrous material by a nonreactive thermoplastic polymer by passing a strand or roving through an impregnation zone in the pultrusion head in a channel in which the thermoplastic polymer is injected at the inlet of the channel on one of the surfaces of said strand to obtain an asymmetrical impregnated fibrous material, that is to say, the impregnated fibrous material has a portion that is rich in fiber and a portion that is rich in thermoplastic polymer in the direction of the thickness.

Each channel present in the pultrusion head is equipped with several contact surfaces allowing the friction of the strand so as to reduce the diffusion time of the thermoplastic polymer through the roving.

The maximum tension force that the strands can withstand is of from 1000 to 15,000 MPa for strands having a mass per unit of length of from 0.05 to 2 g/m. The melt viscosity of the thermoplastic polymer used is of from 25 to 50,000 Pa·s. One skilled in the art will understand that such high viscosities do not allow impregnation in fast enough times and/or over great enough thicknesses to be of any interest from an industrial perspective.

If a roving is considered that passes through the impregnation head in a channel, this roving, at any instant on its journey, is encompassed in the volume of the channel, made up of the volume of the roving and a free volume. Without this free volume, the fiber would occupy the entire volume of the channel, leading to very significant friction on the walls and premature breaking of the rovings. It is therefore this free volume, which is necessary to the method, that generates a residence time of the resin in the head, but said residence time must be limited as much as possible while still allowing the diffusion of the thermoplastic polymer in the roving and not have too great a viscosification of the resin before impregnation, which would prevent impregnation or block the pultrusion head.

Furthermore, when a mixture of prepolymers is used for polymerization, these prepolymers must be fluid enough to be able to impregnate the fibers with this reactive mixture. It is therefore necessary to heat to a high temperature in order to perform the impregnation, in particular when the Tg of the prepolymers is high, but the polymerization reaction then becomes too fast and the viscosification prevents the fibers from being impregnated correctly.

SUMMARY OF THE INVENTION

The invention relates to a method for manufacturing at least one impregnated fibrous material comprising a fibrous material made of continuous fibers and at least one thermoplastic polymer having a glass transition temperature Tg greater than or equal to 40° C., in particular greater than or equal to 80° C., preferably from 100 to 200° C., more preferentially from 110 to 200° C., or a melting temperature Tm less than or equal to 400° C., in particular less than or equal to 350° C., especially less than or equal to 290° C., characterized in that said method comprises a step of impregnating, in a pultrusion head, said at least one fibrous material by injecting a reactive composition in the melt state comprising at least one precursor of said thermoplastic polymer in the presence of said fibrous material, said at least one fibrous material being when it enters said pultrusion head divided in its thickness into n layers, in particular of substantially equal thickness, n being from 2 to 20, in particular from 2 to 10, more particularly from 2 to 5, especially equal to 4, each layer circulating in said pultrusion head in a channel that is specific to it, said reactive composition being injected in each channel and/or between said layers when they are recombined at the exit from each channel, said channel being heated to a temperature such that the reactive composition has an initial melt viscosity of less than 50 Pa·s, more preferentially of less than 20 Pa·s, even more preferentially of less than 10 Pa·s, especially of less than 5 Pa·s, the impregnation starting at the moment of injection and ending before or after said layers are recombined by superposition to form said at least one final impregnated fibrous material wherein said precursors of said thermoplastic polymer are at least partly polymerized.

The Inventors have unexpectedly found that dividing the thickness of a fibrous material to be impregnated with a reactive composition into several layers, especially of substantially equal thickness, each layer circulating in a channel heated to a temperature such that the reactive composition that comprises precursors (also called reactive oligomers or also called reactive prepolymers) with a low starting or initial melt viscosity (<50 Pa·s) and that will impregnate said layers, made it possible to minimize the diffusion time of the reactive composition in said layers and therefore to impregnate said layers before or after they are recombined while performing the polymerization at least partly.

In other words, the method according to the invention makes it possible to satisfy the dual constraint of sufficiently raising the initial viscosity to avoid sufficiently high molar masses (Mn) of the polymer so as to have good mechanical strength and of "controlling" this rise in viscosity/mass so as to ensure the impregnation before the viscosity becomes too great.

This method also makes it possible to minimize the dead space in each channel.

This method therefore makes it possible to reach line speeds greater than 1 m/m in and thus to significantly reduce the production costs of the pultruded profiles.

Furthermore, the reactivity of the oligomers makes it possible, after complete polymerization, to achieve mechanical properties much greater than what is obtained in conventional pultrusion, with equivalent impregnation quality.

The glass transition temperature Tg and the melting temperature Tm are measured by DSC, according to standard ISO 11357-2: 2013 and ISO 11357-3: 2013.

The melt viscosity is measured by oscillatory rheology at a temperature Tm≤T≤Tm+50° C. for a semi-crystalline polymer or Tg+220° C. for an amorphous polymer, at 10 rad/sec under nitrogen flushing with 5% deformation on a Physica MCR301 apparatus between two parallel planes with a diameter of 25 mm.

A semi-crystalline polymer, within the meaning of the invention, denotes a polymer that has a melting temperature (Tm) in DSC according to ISO standard 11357-3:2013, and a crystallization enthalpy during the cooling step at a rate of 20 K/min in DSC measured according to ISO standard 11357-3 of 2013 greater than or equal to 30 J/g, preferably greater than or equal to 35 J/g.

An amorphous polymer, within the meaning of the invention, denotes a polymer having only a glass transition temperature (not a melting temperature (Tm)) by DSC according to ISO standard 11357-2:2013, or a polyamide that has very little crystallinity having a glass transition temperature by DSC according to ISO standard 11357-2: 2013 and a melting temperature such that the crystallization enthalpy during the cooling step at a rate of 20 K/min in differential scanning calorimetry (DSC) measured according to ISO standard 11357-3:2013 is less than 30 J/g, in particular less than 20 J/g, preferably less than 15 J/g.

The expression "of substantially equal thicknesses" means that each layer, after separation of the fibrous material (or strand), has a thickness e±25%, in particular ±12%.

Each layer circulates in its own channel; there is therefore only one layer per channel, and there cannot be two or several layers per channel.

Regarding the Reactive Composition:

The expression "reactive composition" means that the molecular weight of said reactive composition (or its melt viscosity) will change during its implementation because of the reaction of reactive prepolymers (or oligomers) with themselves or together by condensation or with a chain extender by polyaddition and without the elimination of volatile by-products to lead, after polymerization or by complete nucleophile substitution, to the final polyamide polymer of the thermoplastic matrix.

In cases of reactive compositions of the invention, said reactive prepolymers are prepared by classic polycondensation reaction between the corresponding diamine and diacid components and optionally amino acids or lactams. Prepolymers carrying X and Y amine and carboxy functions on the same chain may be obtained for example by adding a combination of monomers (amino acid, diamine, diacid) having in total an equal quantity of amine and carboxy motifs. Another way of obtaining these prepolymers carrying one function X and one Y is, for example, by combining a prepolymer carrying 2 identical functions X=amine, with a diacid prepolymer carrying Y=carboxy, with a global molar level of acid functions equal to that of the starting amine functions X.

To obtain prepolymers functionalized with identical functions (amines or carboxy) on the same chain, having an excess of diamine (or globally, amine functions) suffices for having terminal amine functions or an excess of diacid (or globally, carboxy functions) to have terminal carboxy functions.

According to a first possibility, said at least partly polymerized reactive thermoplastic prepolymer comprises at least one reactive (in particular polyamide) prepolymer carrier on the same chain (that is to say, on the same prepolymer), two terminal functions X' and Y' that are respectively co-reactive with one another by condensation, with X' and Y' being amine and carboxy or carboxy and amine, respectively.

Advantageously, said at least partially polymerized reactive thermoplastic prepolymer consists of at least one reactive prepolymer (in particular polyamide) carrying on the same chain (that is to say, on the same prepolymer), two terminal functions X' and Y', functions that are respectively co-reactive together by condensation, with X' and Y' being amine and carboxyl or carboxyl and amine, respectively.

There is therefore no chain extender present in this first embodiment.

According to a second possibility, said at least partially polymerized reactive thermoplastic prepolymer comprises at least two polyamide prepolymers that react together and each carry respectively two identical terminal functions X' or Y'(identical for the same prepolymer and different between the two prepolymers), where said function X' of a prepolymer can react only with said function Y' of the other prepolymer, particularly by condensation, more particularly with X' and Y' being amine and carboxyl or carboxyl and amine respectively.

Advantageously, said at least partially polymerized reactive thermoplastic prepolymer consists of at least two polyamide prepolymers that react together and each carry respectively two identical terminal functions X' or Y' (identical for the same prepolymer and different between the two prepolymers), where said function X' of a prepolymer can react only with said function Y' of the other prepolymer, particularly by condensation, more particularly with X' and Y' being amine and carboxyl or carboxyl and amine respectively.

The at least two prepolymers may or may not be mixed together beforehand.

This condensation (or polycondensation) reaction may cause the appearance of by-products.

There is therefore no chain extender present in this second embodiment.

The reaction of the two prepolymers can be total or partial.

According to a third possibility, said at least partially reactive thermoplastic prepolymer polymerized with the chain extender comprises:

a1) at least one reactive thermoplastic prepolymer as already defined hereinabove with this prepolymer bearing n identical reactive terminal functions X, chosen from: —NH2 (amine), —CO2H (carboxy) and —OH (hydroxyl), preferably —NH2 (amine) and —CO2H (carboxy) with n being 1 to 3, preferably from 1 to 2, more preferably 1 or 2, more particularly 2 a2) at least one chain extender Y-A'-Y, with A' being a hydrocarbon bisubstituent, bearing 2 identical terminal reactive functions Y, reactive by polyaddition (without elimination of the reaction byproduct), with at least one function X of said prepolymer a1), preferably having a molecular mass less than 500 and more preferably less than 400.

Advantageously, said at least one partially polymerized reactive thermoplastic prepolymer with the chain extender is consists of a1) and a2) defined hereinabove.

Advantageously, Y is chosen from: oxazine, oxazoline, oxazolinone, oxazinone, imidazoline, epoxy, isocyanate, maleimide, cyclic anhydride, in particular oxazine, oxazoline, oxazolinone, oxazinone, imidazoline, maleimide, cyclic anhydride and preferably X1 is CO2H and Y1 is chosen from an epoxy and an oxazoline.

NH2 (amine) means primary and secondary amine.

Examples of suitable extenders a2) as a function of the X functions carried by said semi-crystalline polyamide prepolymer a1) include the following:

when X is NH2 or OH, preferably NH2:
either chain extender Y-A'-Y corresponds to
Y being chosen from the groups: maleimide, isocyanate, optionally blocked, oxazinone and oxazolinone, cyclic anhydride, preferably oxazinone and oxazolinone, in particular maleimide, oxazinone and oxazolinone, cyclic anhydride, preferably oxazinone and oxazolinone
and
A' is a spacer or a carbonaceous substituent bearing the reactive functions or groups Y, chosen from: a covalent bond between two functions (groups) Y in the case where Y=oxazinone and oxazolinone or
an aliphatic hydrocarbon chain or an aromatic and/or cycloaliphatic hydrocarbon chain, the latter two comprising at least one ring with 5 or 6 carbon atoms optionally substituted, with optionally said aliphatic hydrocarbon chain having optionally a molecular weight of 14 to 200 g·mol-1 or chain extender Y-A'-Y corresponds to Y being a caprolactam group and A' being able to be a carbonyl substituent such as carbonyl biscaprolactam or A' being able to be a terephthaloyl or an isophthaloyl,
or said chain extender Y-A'-Y carries a cyclic anhydride group Y and preferably this extender is chosen from a carboxylic cycloaliphatic and/or aromatic dianhydride and more preferably is chosen from: ethylenetetracarboxylic dianhydride, pyromellitic dianhydride, 3,3',4,4'-biphenyltetracarboxylic dianhydride, 1,4,5,8-naphthalenetetracarboxylic dianhydride, perylenetetracarboxylic dianhydride, 3,3', 4,4'-benzophenone tetracarboxylic dianhydride, 1,2,3,4-cyclobutanetetracarboxylic dianhydride, hexafluoroisopropylidene bisphthalic dianhydride, 9,9-bis (trifluoromethyl)xanthenetetracarboxylic dianhydride, 3,3', 4,4'-diphenylsulfonetetracarboxylic dianhydride, bicyclo [2.2.2]oct-7-ene-2,3,5,6-tetracarboxylic dianhydride, 1,2,3, 4-cyclopentanetetracarboxylic dianhydride, 3,3',4,4'-diphenyl ether tetracarboxylic dianhydride or mixtures thereof and when X is COOH:
said chain extender Y-A'-Y corresponds to:
Y chosen from the groups: oxazoline, oxazine, imidazoline or aziridine, like 1,1'-iso- or tere-phthaloyl-bis(2-methyl aziridine) or epoxy,
A' being a carbon spacer or substituent as defined above.

More particularly, when in said extender Y-A'-Y, said function Y is chosen from oxazinone, oxazolinone, oxazine, oxazoline or imidazoline, in particular oxazoline, in this case, in the chain extender represented by Y-A'-Y, A' may represent an alkylene such as —(CH2)m- where m ranges from 1 to 14 and preferably from 2 to 10 or A' may represent a cycloalkylene and/or a substituted (alkyle) or unsubstituted arylene, like benzene arylenes, such as o-, m-, -p phenylenes or naphthalene arylenes and preferably A' is an arylene and/or a cycloalkylene.

In the case of carbonyl- or terephthaloyl- or isophthaloyl-biscaprolactam as chain extender Y-A'-Y, the preferred conditions avoid the elimination of by-products, like the caprolactam during said polymerization and implementation when melted.

In the case where Y is an epoxy, the chain extender may be chosen from bisphenol A diglycidyl ether (BADGE) and its hydrogenated derivative (cycloaliphatic), bisphenol F diglycidyl ether, tetrabromobisphenol A diglycidyl ether or hydroquinone diglycidyl ethers, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether with Mn<500, polypropylene glycol diglycidyl ether with Mn<500, polytetramethylene glycol diglycidyl ether with Mn<500, resorcinol diglycidyl ether, neopentylglycol diglycidyl ether, bisphenol A polyethylene glycol diglycidyl ether with Mn<500, bisphenol A polypropyleneglycol diglycidyl ether with Mn<500, dicarboxylic acid diglycidyl esters like the glycidyl ester of terephthalic acid or epoxidized diolefins (dienes) or fatty acids with double epoxidized ethylenic unsaturation, diglycidyl 1,2 cyclohexane dicarboxylate and mixtures thereof.

In the case of carbonyl- or terephthaloyl- or isophthaloyl-biscaprolactam as chain extender Y-A'-Y, the preferred conditions avoid the elimination of by-products, like the caprolactam during said polymerization and implementation when melted.

In the eventual case cited above where Y represents a blocked isocyanate function, this blocking can be achieved by blocking agents for the isocyanate function, like epsilon-caprolactam, methyl ethyl ketoxime, dimethyl pyrazole, di ethyl malonate.

Similarly, in the case where the extender is a dianhydride reacting with a prepolymer P(X')n where X=NH2, the preferred conditions avoid any imide ring formation during the polymerization and during molten implementation.

For X=OH or NH2, the group Y is preferably chosen from: isocyanate (not blocked), oxazinone and oxazolinone, more preferentially oxazinone and oxazolinone, with A' as defined hereinabove as spacer or hydrocarbon substituent.

Examples of chain extenders carrying oxazoline or oxazine reactive functions Y suitable for the implementation of the invention include those we can refer to those referenced "A", "B", "C" and "D" on page 7 of application EP 0,581,642, and to methods of preparation thereof and to the modes of reaction described therein. "A" in this document is bisoxazoline, "B" bisoxazine, "C" 1,3 phenylene bisoxazoline and "D" 1,4-phenylene bisoxazoline.

By way of example, in the case where X=CO2H and the chain extender Y-A'-Y is 1,4-phenylene bisoxazoline, the resulting reaction product has at least one recurring motif with the following structure:

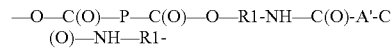

wherein:
P is a polyamide with acid terminations HO—C(O)—P—C(O)—OH obtained from amide motifs (A), (B) or (C),
R1 (CH2)2, and
A' is a phenyl.

Examples of chain extenders with imidazoline reactive function Y suitable for implementation of the invention include those we can refer to described as ("A" to "F") on page 7 to 8 and Table 1 of page 10 in application EP 0,739,924 and to methods of preparation thereof and to the modes of reaction described there.

Examples of chain extenders with reactive function Y=oxazinone or oxazolinone which are suitable for the implementation of the invention include those we can refer to described as references "A" to "D" on page 7 to 8 of application EP 0,581,641 and to methods of preparation thereof and to the modes of reaction described there.

Examples of suitable oxazinone (6-membered ring) and oxazolinone (5-membered ring) Y groups include Y group derivatives of: benzoxazinone oxazinone or oxazolinone, with as spacer A' being able to be a single covalent bond with corresponding respective extenders being: bis-(benzoxazinone), bisoxazinone and bisoxazolinone.

A' may also be a C1 to C14 alkylene, preferably C2 to C10 but preferably A' is an arylene and more particularly it may be a phenylene (substituted by Y in the 1,2 or 1,3 or 1,4 positions) or a naphtalene substituent (disubstituted by Y) or a phthaloyl (iso- or terephthaloyl) or A' may be a cycloalkylene.

For Y functions like oxazine (6-membered ring), oxazoline (5-membered ring) and imidazoline (5-membered ring), the substituent A' may be as described above where A' can be a single covalent bond and with the corresponding respective extenders being: bisoxazine, bisoxazoline and bisimidazoline. A' may also be a C1 to C14 alkylene, preferably C2 to C10. Substituent A' is preferably an arylene and, more particularly, it may be a phenylene (substituted by Y in the 1,2 or 1,3 or 1,4 positions) or a naphthalene substituent (disubstituted by Y) or a phthaloyl (iso- or terephthaloyl) or A' may be a cycloalkylene.

In the case where Y=aziridine (nitrogen heterocycle with 3 atoms equivalent to ethylene oxide replacing the ether —O— with —NH—), the substituent A' may be a phthaloyl (1,1'iso- or tere-phthaloyl) with as example of extender of this type, 1,1' isophthaloyl-bis(2-methyl aziridine).

The presence of a catalyst for the reaction between said prepolymer P(X)n and said extender Y-A'-Y at a level ranging from 0.001 to 2%, preferably from 0.01 to 0.5% relative to the total weight of two co-reactants cited may accelerate the (poly)addition reaction and accordingly shorten the production cycle. Such a catalyst can be chosen from: 4,4' dimethyl aminopyridine, p-toluene sulfonic acid, phosphoric acid, NaOH and optionally those described for a polycondensation or transesterification as described in EP 0,425,341, page 9, lines 1 to 7.

Depending on a more particular case of choice of said extender, A' may represent an alkylene, such as —(CH2)m- where m ranges from 1 to 14 and preferably from 2 to 10 or represents an alkyl substituted or unsubstituted arylene, like benzene arylenes (like o-, m-, -p phenylenes) or naphthalene (with arylenes: naphthalenylenes). Preferably, A' represents an arylene that may be benzene or naphthalene substituted or unsubstituted.

As already stated, said chain extender (a2) preferably has a molecular weight less than 500, more preferentially less than 400.

The proportion of said used extender varies from 1 to 20%, in particular from 5 to 20%, especially from 10 to 20% by weight.

In cases of reactive compositions of the invention according to definition a), said reactive prepolymers are prepared by classic polycondensation reaction between the corresponding diamine and diacid components and optionally amino acids or lactams. Prepolymers carrying X' and Y' amine and carboxy functions on the same chain may be obtained for example by adding a combination of monomers (amino acid, diamine, diacid) having in total an equal quantity of amine and carboxy motifs. Another way of obtaining these prepolymers carrying one function X' and one Y' is, for example, by combining a prepolymer carrying 2 identical functions X'=amine, with a diacid prepolymer carrying Y': carboxy, with a global molar level of acid functions equal to that of the starting amine functions X'.

To obtain prepolymers functionalized with identical functions (amines or carboxy) on the same chain, having an excess of diamine (or globally, amine functions) suffices for having terminal amine functions or an excess of diacid (or globally, carboxy functions) to have terminal carboxy functions.

In the case of a prepolymer P(X1)n with n identical X1 functions, the functionality 1 can be obtained in the presence of a monofunctional blocking component (monoacid or monoamine depending on the nature of X1=amine or carboxy).

A functionality n=2 may be obtained from difunctional components: diamines and diacids with an excess of one to bond X1 depending on this excess.

For n=3 for example, for a prepolymer P(X1)n, the presence of a trifunctional component is necessary, for example the presence of a triamine (one mole per chain of prepolymer) with a diamine in the reaction with a diacid. The preferred functionality for P(X1)n is n=2.

Optionally, the thermoplastic prepolymer or thermoplastic prepolymer mixture further comprises carbon-based fillers, in particular carbon black or carbon nanofillers, preferably selected from among carbon nanofillers, in particular graphenes and/or carbon nanotubes and/or carbon nanofibrils or mixtures thereof. These fillers serve to conduct electricity and heat, and consequently serve to make melting of the prepolymer matrix easier when it is heated.

The number-average molecular weight Mn of said final thermoplastic polymer, that is after complete polymerization, is preferably in a range from 10,000 to 40,000, preferably from 12,000 to 30,000 determined in particular by the calculation from the level of terminal functions determined by potentiometric titration in solution and the functionality of said prepolymers.

The masses Mn may also be determined by size exclusion chromatography or by NMR.

These Mn values may correspond to inherent viscosities greater than or equal to 0.8, as determined in m-cresol according to standard ISO 307:2007 but by changing the solvent (use of m-cresol instead of sulfuric acid and the temperature being 20° C.).

Said precursor prepolymers have a number-average molecular weight Mn ranging from 500 to 10,000, preferably from 1,000 to 6,000, in particular from 2,500 to 6,000.

In one embodiment, said reactive composition comprises or consists of:
  from 50 to 100% by weight of at least one precursor of said thermoplastic polymer,
  from 0 to 50% by weight of at least one additive and/or of at least one other thermoplastic polymer, The additives may be chosen from, but are not limited to, specific additives able to absorb at the wavelength of a laser, for example a UV or IR laser, which allows the use of automatic fiber placement (AFP) technology, in the case where the latter uses a laser heating mode, to weld the composite ribbons to one another, in particular in the case of composite ribbons with a base of glass or carbon fibers. Other additives such as heat stabilizers may be added to the precursor composition and therefore be present in the final thermoplastic composite material as used in the final application parts, in particular these stabilizers being antioxidants, against thermal oxidation and/or photo-oxidation of the polymer of the thermoplastic matrix. Said antioxidants are of the sterically hindered phenolic and/or sterically hindered amine type (known by the common name HALS). Suitable examples of such additives include carbon black (CB) in the form of CB powder, or preferably in the form of master batches with a base of CB and polyethylene (PE) or of CB and polyamide (PA), TiO2 (titanium oxide), ZnO (zinc oxide) and, in the case of an IR laser, indium tin oxide (sold by Evonik) and heat stabilizers as cited above. One example of a CB+PE master batch with about 40% CB is EUTHYLEN® sold by BASF. One example of a CB+PA master batch with about 15% CB is RENOL® BLACK sold by CLARIANCE.

The additives may also be fillers which, in addition to long reinforcing fibers, may in particular be any filler known to the person skilled in the art in the field of composites. This may in particular be heat-conducting and/or electricity-conducting fillers, such as metal powder, powdered carbon black, carbon fibrils, carbon nanotubes (CNT), silicon carbide, boron carbonitride, boron or silicon nitride. On this subject reference can be made to application WO 2010/130930 by the Applicant.

It is clear that long reinforcing fibers (or long fibrous reinforcements) are excluded from additives.

The additives can also be flame retardants, such as a metal salt chosen from a phosphinic acid metal salt, a metal salt of diphosphinic acid, a polymer containing at least one metal salt of phosphinic acid, a polymer containing at least one metal salt of diphosphinic acid.

The expression "other polymers" denotes any nonreactive thermoplastic polymer and in particular a polyamide polymer, in particular an aliphatic, cycloaliphatic or aromatic polyamide, and that can be semi-crystalline or amorphous.

"Nonreactive thermoplastic polymer" must be understood to mean a polymer whose molecular weight is no longer likely to change significantly, i.e. its number average molecular weight (Mn) changes by less than 50% during its implementation.

Regarding the Injection

Said reactive composition is injected into each channel, in a position that may be at the inlet of each channel, at the outlet of each channel or between the inlet and the outlet of each channel (in the latter case, there may be one or several injection points) and/or between said layers when they leave each channel.

In a first variant, the injection is done between said layers when they leave each channel.

Advantageously, in this embodiment, the reactive composition is injected between two layers, in pairs, at the outlet of said channels, said two layers then being impregnated in order to form an impregnated bilayer material, each impregnated bilayer material subsequently being assembled in its thickness with the others in order to form said final impregnated fibrous material.

In a second variant, the injection is done at the inlet of each channel.

In a third variant, the injection is done at the inlet of each channel and between said layers when they leave each channel.

In a fourth variant, the injection is done at the inlet of each channel and between the inlet and the outlet of each channel.

In a fifth variant, the injection is done between the inlet and the outlet of each channel and between said layers when they leave each channel.

In a sixth variant, the injection is done at the inlet of each channel and between the inlet and the outlet of each channel and between said layers when they leave each channel.

Regarding the Channels and the Layers

The fibrous material consists of a set of rovings, possibly up to several thousand.

Before impregnation, the fibrous material is divided into n layers in its thickness during its entry into said pultrusion head. It is clear that at least one fibrous material enters the pultrusion head and as a result, when several fibrous materials enter the pultrusion head, each fibrous material is divided in its thickness into n layers.

The components of the reactive composition are mixed in a supply channel, at the inlet or the outlet of said channel.

The channels are heated to a temperature such that the reactive composition has an initial melt viscosity of less than 50 Pa·s, more preferentially less than 20 Pa·s, still more preferentially less than 10 Pa·s, especially less than 5 Pa·s.

The initial viscosity means the viscosity at the time t of mixing in the supply channel of said reactive composition, that is to say, when the reactive composition is introduced into the supply channel, the initial viscosity of said reactive composition is less than 50 Pa·s, more preferentially less than 20 Pa·s, still more preferentially less than 10 Pa·s, especially less than 5 Pa·s, or when said reactive composition is introduced between said layers at the outlet of said channel, each layer having circulated in a channel that is heated, said layer is then itself at the temperature of said channel and the initial viscosity of said reactive composition is also less than 50 Pa·s, more preferentially less than 20 Pa·s, still more preferentially less than 10 Pa·s, especially less than 5 Pa·s.

The low viscosity during the injection of said reactive composition allows rapid impregnation of said layer by said reactive composition.

The impregnation begins at the moment of the injection and the polymerization of said reactive composition begins as of the mixing of the components, or shortly before the beginning of the impregnation.

The impregnation and the at least partial polymerization are therefore concomitant in the method according to the invention.

The impregnation, based on the position of the injection, ends either before said layers are brought together if the injection is done at the inlet and/or between the inlet and the outlet of each channel, or after they are brought together if the injection is done between the inlet and the outlet of the channels and/or the outlet of each channel.

The bringing together is of course done by superimposing said impregnated layers to obtain said impregnated fibrous material.

Depending on the position of the injection, the impregnation and the at least partial polymerization being concomitant in the method according to the invention, said precursors impregnating said fibrous material are therefore at least partially polymerized after said layers are brought together.

The expression "at least partly polymerized" means that the number-average molecular weight has increased by a factor at least equal to 2, without, however, exceeding 10,000, preferably 8,000.

After the bringing together, said fibrous material impregnated by said at least partly polymerized precursors is still located in the pultrusion head, in a single channel having its own heating system and any supporters, which makes it possible, as needed, to finalize the impregnation and/or to continue the polymerization of the reactive mixture.

In one embodiment, the method as defined hereinbefore is characterized in that the maximum thickness e of each layer is such that the impregnation time of each layer is less than or equal to the time required to increase the Mn of the reactive composition in said layer by a factor of 5, preferentially by a factor of 3, especially by a factor of 2.

In other words, the method as defined hereinbefore is characterized in that the maximum thickness e of each n layer is subject to the constraint of being less than or equal to a maximum bound defined as being proportional to the square root of the integral over the residence time $t_{sf}$ of said layer in the die of the function defined as equal to the ratio of the product of the permeability K by the fluid pressure exerted on said layer P to the product of the volume fraction $\alpha_f$ of the composition in the fibrous medium by the viscosity of the reactive composition µ, the aforementioned proportionality constant C being less than or equal to 14, in particular less than or equal to 7, especially less than or equal to 3, or:

$$e^2 \leq C^2 \int_0^{t_{sf}} \frac{K(s)P(s)}{\alpha_f(s)\mu(s)} ds$$

Furthermore, the channel is defined as representing the volume in which a layer of fibrous material travels while passing in the impregnation head.

If a fibrous material is considered chosen randomly in one of the layers that pass through the impregnation head in a channel, this roving, at any instant on its journey, is encompassed in the volume of the channel, made up of the volume of said roving making up the layer and a free volume. Without this free volume, the material would occupy the entire volume of the channel, leading to very significant friction on the walls and premature breaking of the rovings.

It is therefore this free volume, necessary for the method, that generates a residence time of the reactive composition, in the head, different from the residence time of the rovings (directly related to the line speed).

In one embodiment, the mean residence time of the reactive composition in the head is at most equal to 3, preferably 2 and even more preferably 1.5 times the residence time of said fibrous material.

This makes it possible to avoid a blockage of the head due to a locally excessive viscosity that blocks the movement of the layers or prevents proper impregnation thereof.

The channels can have varied shapes, but in one embodiment, they are cylindrical or not, in particular cylindrical.

A cylinder is a ruled surface whose generators are parallel, that is to say, a surface in space made up of parallel lines.

The ruled surface can therefore be square, rectangular, circular, elliptical (or oblong), conical, U-shaped, T-shaped . . . .

The thickness of the channel is a characteristic dimension of the base of the cylinder, and as a result, if the base is square, then e=side of the square. If the base is a rectangle, then a characteristic dimension is the small side that corresponds to the thickness. If the base is circular, e=diameter. If the base is elliptical, e=small axis of the ellipse . . . .

In one embodiment, the channels are cylindrical in shape, and each channel having a thickness proportional to the thickness of each n layer, the thickness of each channel is between 2 and 3 times the thickness of each n layer, in particular between 1.5 and 2 times the thickness of each layer.

Advantageously, the channels are cylindrical with a rectangular surface.

Friction points or contact zones (or contact points) may be placed alternatively above and below said fibrous materials in each channel, thus allowing the spreading of said layers of fibrous materials and/or allowing a reduction in the impregnation time, since these contact points allow a local pressure increase.

These contact points make it possible to generate a skate effect in the supporter/roving junction zone, which makes it possible to reduce the diffusion time.

However, the number and the surface area of the contact zones must be limited and must have a large enough curve radius so as not to lead to the breaking of said fibrous materials (rovings) due to excessive tension on the fibers.

In one embodiment, each channel is fitted with at least one contact zone having a radius of curvature of greater than d/breaking eps (d/ε), d being the diameter of the fibers of the fibrous material and eps being the deformation at break of the fibers, placed alternately above or below the rovings during their travel in the impregnation head in order to cause and/or maintain spreading of the fibrous material, optionally initiated beforehand upstream of the head, without damaging said fibrous material.

The deformation at break of the fibers is determined on a cylinder of carbon/epoxy resin composite fibers, by measuring the maximum elongation at break during a tensile test on this composite.

It is subsequently considered that the tensile strength of the resin in the direction of the fibers is negligible compared with the tensile strength of the fibers, and therefore the elongation at break of the composite is that of the fibers.

ISO 527-4:1997 or EN 2561 Type B (1996) can be used.

The curve radii of the contact zones on said fibrous material must not be too small so as not to damage the fibrous material.

As a result, the curve radius must not be less than or equal to d/eps break (d/ε); otherwise, the fibrous material is damaged.

Advantageously, each channel has up to 5 contact zones.

In one embodiment, each channel is devoid of contact zones placed alternately above or below the rovings during their travel in the impregnation head, in particular when the channels are conical in shape.

Regarding the Thermoplastic Polymer

Said thermoplastic polymer is selected from: polyaryl ether ketones (PAEK), in particular polyether ether ketone (PEEK) and polyether ketone ketone (PEKK); polyaryl sulfones, in particular polyphenylene sulfones (PPSU); polyarylsulfides, in particular polyphenylene sulfides (PPS); polyamides (PA), in particular semi-aromatic polyamides (polyphthalamides) optionally modified by urea units; PEBAs, polyacrylates, in particular polymethyl methacrylate (PMMA); polyolefins, in particular polypropylene, polylactic acid (PLA), polyvinyl alcohol (PVA), and fluorinated polymers, in particular polyvinylidene fluoride (PVDF) or polytetrafluoroethylene (PTFE) or polychlorotrifluoroethylene (PCTFE); and mixtures thereof, especially a mixture of PEKK and PEI, preferably from 90-10% by weight to 60-40% by weight, in particular from 90-10% by weight to 70-30% by weight.

It is clear that the thermoplastic polymer must be available in reactive prepolymer form so as to be able to impregnate said fibrous material.

The nomenclature used to define the polyamides is described in ISO standard 1874-1:2011 "Plastiques—Matériaux polyamides (PA) pour moulage et extrusion—Partie 1: Designation", in particular on page 3 (Tables 1 and 2) and is well known to the skilled person.

The polyamide may be a homopolyamide or a co-polyamide or a mixture thereof.

In one embodiment, said at least one thermoplastic polymer is selected from polyamides, in particular aliphatic polyamides, cycloaliphatic polyamides and semi-aromatic polyamides (polyphthalamides), PVDF, PEEK, PEKK, PEI and a PEKK and PEI mixture.

In another embodiment, said at least one thermoplastic polymer is selected from polyamides, in particular aliphatic polyamides, cycloaliphatic polyamides and semi-aromatic polyamides (polyphthalamides).

Advantageously, said thermoplastic polymer is a polymer whose glass transition temperature is such that Tg 80° C., or a semi-crystalline polymer whose melting temperature Tm 150° C.

Advantageously, said thermoplastic polymer is:
an aliphatic polyamide chosen from polyamide 6 (PA-6), polyamide 11 (PA-11), polyamide 12 (PA-12), polyamide 66 (PA-66), polyamide 46 (PA-46), polyamide 610 (PA-610), polyamide 612 (PA-612), polyamide 1010 (PA-1010), polyamide 1012 (PA-1012), or a mixture thereof or a copolyamide thereof,
a semi-aromatic polyamide, optionally modified with urea units, particularly a semi-aromatic polyamide of formula X/YAr, as described in EP1505099, particularly a semi-aromatic polyamide of formula A/XT in which A is selected from a unit obtained from an amino acid, a unit obtained from a lactam and a unit corresponding to the formula (Ca diamine).(Cb diacid), with a representing the number of carbon atoms of the diamine and b representing the number of carbon atoms of the diacid, a and b each being between 4 and 36, advantageously between 9 and 18, the unit (Ca diamine) being selected from linear or branched aliphatic diamines, cycloaliphatic diamines and alkylaromatic diamines and the unit (Cb diacid) being selected from linear or branched aliphatic diacids, cycloaliphatic diacids and aromatic diacids;
X.T denotes a unit obtained from the polycondensation of a Cx diamine and terephthalic acid, with x representing the number of carbon atoms of the Cx diamine, x being between 6 and 36, advantageously between 9 and 18, in particular a polyamide with formula A/6T, A/9T, A/10T or A/11T, A being as defined hereinbefore, in particular a polyamide PA 6/6T, a PA 66/6T, a PA 6I/6T, a PA MPMDT/6T, a PA MXDT/6T, a PA PA11/10T, a PA 5T/10T, a PA 11/5T/10T, a PA 11/6T/10T, a PA MXDT/10T, a PA MPMDT/10T, a PA BACT/10T, a PA BACT/6T, PA BACT/10T/6T, a PA 11/BACT/10T, a PA 11/BACT/6T a PA 11/MPMDT/10T and a PA 11/MXDT/10T, and block copolymers, particularly polyamide/polyether (PEBA).

T corresponds to terephthalic acid, MXD corresponds to m-xylylene diamine, MPMD corresponds to methylpentamethylene diamine and BAC corresponds to bis(aminomethyl)cyclohexane.

Optionally, the thermoplastic polymer or blend of thermoplastic polymers further comprises carbon-based fillers, in particular carbon black or carbon-based nanofillers, preferably selected from among carbon nanofillers, in particular graphenes and/or carbon nanotubes and/or carbon nanofibrils or their blends. These fillers make it possible to conduct electricity and heat, and as a result to accelerate the melting of the polymer matrix when it is heated, in particular by IR.

Of course, these carbon fillers are initially present in the reactive composition.

Regarding the Fibrous Material

The component fibers of said fibrous material are in particular continuous fibers selected from carbon, glass, silicon carbide, with a base of basalt, silica fibers, natural fibers, in particular flax or hemp, lignin, bamboo, sisal, silk, or cellulose, in particular viscose, fibers, or amorphous thermoplastic fibers with a glass transition temperature Tg higher than the Tg of said polymer or said polymer mixture when the latter is amorphous or higher than the Tm of said polymer or said polymer mixture when the latter is semi-crystalline, or the semi-crystalline thermoplastic fibers with a melting temperature Tm higher than the Tg of said polymer or said polymer mixture when the latter is amorphous or higher than the Tm of said polymer or said polymer mixture when the latter is semi-crystalline, or a mixture of two or more of said fibers, preferably a mixture of carbon, glass or silicon carbide fibers, in particular carbon fibers.

Advantageously, the number of fibers in said fibrous material for carbon fibers is greater than or equal to 3K, in particular greater than or equal to 6K, particularly greater than or equal to 12K.

Advantageously, the number of fibers in said fibrous material for carbon fibers is greater than or equal to 12K, in particular chosen from 12K, 24K, 48K, 50K and 400K, particularly 12K, 24K, 48K and 50K.

Advantageously, the grammage for the fiberglass is greater than or equal to 1,200 Tex, in particular greater than or equal to 2,400 Tex, greater than or equal to 4,800 Tex.

The Tex means that 1000 m of base yarn weighs 1 g.

These component fibers of said fibrous material can be used alone or in mixtures. Thus, organic fibers can be mixed with mineral fibers in order to be impregnated with thermoplastic polymer and to form the impregnated fibrous material.

The organic fiber strands can have several grammages. They can further have several geometries.

In one embodiment, the fibrous material is composed of continuous carbon, glass, basalt or a base of basalt, or silicon carbide fibers or a mixture thereof, in particular carbon fibers.

The fibers of the fibrous material may or may not be sized.

The term "sized" refers to the surface treatments applied to the fibrous materials during the manufacture thereof. It may also refer to a transient pretreatment at the beginning of the pre-impregnation step, whether it is carried out directly in line with the impregnation or not.

The term "non-sized" means that the fiber is either not initially sized and therefore has not undergone surface treatment, or that the fiber has been de-sized prior to its use.

They are generally organic (of the thermosetting or thermoplastic resin type) and quite often formulated for the pre-impregnation of polymer reinforcing fibers with a low melting point Tm or thermosetting with a low Tg point.

These sizings are also useful to protect the dry fibers from damage during contact with a guiding system.

The term "non-sized" means that the fiber is either not initially sized and therefore has not undergone surface treatment, or that the fiber has been de-sized prior to its use.

In the case of a non-sized material, said fibrous material may comprise up to 0.1% by weight of an organic material (thermosetting or thermoplastic resin type) called sizing.

In the case of a transient pretreatment carried out by the impregnator for example at the beginning of the step of pre-impregnating the reinforcing fibers, the sizing can be an organic liquid such as water, a low- or high-molecular weight alcohol (ethanol, methanol, isopropanol for example), a ketone (acetone, etc.) which will serve as transient sizing; that is to say, it will be present for a short length of time in contact with the fiber to allow it to be manipulated in the "dry" state (that is to say, before the pre-impregnation) and it will next be removed from the composite material so as not to disrupt the final characteristics of the composite.

In the case of a sized material, said fibrous material can comprise from 0.1% by weight to 2.5% by weight of an organic material (thermosetting or thermoplastic resin type) called sizing.

Advantageously, the fibers of the fibrous material are sized.

Regarding the Impregnated Fibrous Material

The fiber level in said impregnated fibrous material is of from 45 to 80% by volume, preferably from 50 to 65% by volume, in particular from 54 to 60%. Advantageously, the porosity level in said impregnated fibrous material is less than 10%, in particular less than 5%, particularly less than 2%.

It should be noted that a nil porosity level is difficult to achieve and that as a result, advantageously the porosity level is greater than 0% but less than the levels cited above.

The porosity level corresponds to the closed porosity level and can be determined either by electron microscopy, or as being the relative deviation between the theoretical density and the experimental density of said impregnated fibrous material as described in the examples section of the present invention.

Shaping Step

Optionally, a step of shaping of the strand or said parallel strands of said impregnated fibrous material is carried out.

In one embodiment, said method defined hereinbefore further comprises a step of shaping said parallel strand(s) of said impregnated fibrous material, by means of at least one calender or a heating or cooling forming machine, in the form of a single unidirectional ribbon or a plurality of parallel ribbons, or in the form of a U-shaped or T-shaped profiled element or in the form of a ring or of a plurality of parallel unidirectional ribbon rings, said forming machine being or not being in contact with said impregnation head.

Advantageously, the calendering step or shaping step is carried out using a plurality of heating or cooling calenders, or heating or cooling forming machines mounted in parallel and/or in series with respect to the direction of passage of the fiber strands.

A calendering system as described in WO 2015/121583 may be used.

Advantageously, it is done by calendering using at least one heating calender in the form of a single unidirectional ribbon or sheet or a plurality of parallel unidirectional ribbons or sheets with, in the latter case, said heating calender including a plurality of calendering grooves, preferably up to 200 calendering grooves, in accordance with the number of said ribbons and with a pressure and/or separation between the rollers of said calender regulated by a closed-loop control system.

Advantageously, the calendering step is carried out using a plurality of heating calenders, mounted in parallel and/or in series relative to the passage direction of the fiber rovings.

Advantageously, said heating calender(s) comprise(s) an integrated induction or microwave heating system, preferably microwave, coupled with the presence of carbon fillers in said thermoplastic polymer or mixture of thermoplastic polymers.

According to another embodiment, a belt press is present between the pultrusion head and the calender.

According to yet another embodiment, a series of post-polymerization furnaces is present between the pultrusion head and the last forming machine or the last calender.

Advantageously, the step for shaping said parallel strand (s) of said impregnated fibrous material, by calendering using at least one heating calender in the form of a single unidirectional ribbon or sheet or a plurality of parallel unidirectional ribbons or sheets with, in the latter case, said heating calender comprising a plurality of calendering grooves, preferably up to 300 calendering grooves, in accordance with the number of said ribbons and with a pressure and/or separation between the rollers of said calender regulated by a closed-loop control system.

Advantageously, the calendering step is carried out using a plurality of heating calenders, mounted in parallel and/or in series relative to the passage direction of the fiber rovings.

Advantageously, said heating calender(s) comprise(s) an integrated induction or microwave heating system, preferably microwave, coupled with the presence of carbon fillers in said thermoplastic polymer or mixture of thermoplastic polymers.

In one embodiment, said heating calender(s) is (are) coupled to a complementary heating device, located before and/or after said (each) calender, in particular a microwave or induction heating device coupled with the presence of carbon-based fillers in said polymer or in said mixture of polymers, or an infrared IR or laser heating device or a device for heating by direct contact with another source of heat.

Regarding the Ribbon

According to another aspect, the present invention relates to a unidirectional ribbon of impregnated fibrous material, in particular a ribbon wound on a spool, characterized in that it is obtained using a method comprising a shaping step as defined hereinbefore.

In one embodiment, said ribbon is characterized in that the thermoplastic polymer is an aliphatic polyamide selected from PA 6, PA 11, PA 12, PA 66, PA 46, PA 610, PA 612, PA 1010, PA 1012, PA 11/1010 or PA 12/1010 or a semi-aromatic polyamide such as a PA MXD6 and a PA MXD10 or selected from PA 6/6T, PA 6I/6T, PA 66/6T, PA 11/10T, PA 5T/10T, PA 11/5T/10T, PA 11/6T/10T, PA MXDT/10T, PA MPMDT/10T, PA BACT/6T, PA BACT/10T and PA BACT/10T/6T, PA BACT/10T/11, PA BACT/6T/11, a PVDF, a PEEK, PEKK and a PEI or a mixture thereof.

According to another aspect, the present invention relates to the use of a method as defined hereinabove, for the manufacture of calibrated ribbons suitable for the manufacture of three-dimensional composite parts, by the automatic laying of the said ribbons by means of a robot.

In one embodiment, said ribbon of impregnated fibrous material, as defined above, is used to manufacture three-dimensional composite parts.

In one embodiment, said manufacture of said composite parts relates to the fields of transportation, in particular automotive, oil and gas, in particular offshore, gas storage, aeronautics, naval, railways; renewable energies, in particular wind energy, hydro turbines, energy storage devices, solar panels; thermal protection panels; sports and recreation, health and medical and electronics.

According to yet another aspect, the present invention relates to a three-dimensional composite part, characterized in that it results from the use of at least one unidirectional ribbon of impregnated fibrous material as defined hereinabove.

Other goals, advantages and features will emerge from the following description given as a purely illustrative example and made with reference to the attached drawings, whereupon:

FIG. 1 describes the pultrusion head of example 1 comprising a crosshead die, comprising a system for separating fibers into several layers, using a supporter system submerged in a tank of melt resin: system suitable for use of a nonreactive resin The fibrous material is separated in four, but in a single impregnation chamber. The separated fibrous material therefore does not circulate in a channel specific to it.

FIG. 2 shows a cross sectional view of the morphology of the impregnated fibrous material of example 1 (pultruded profile) with nonreactive resin 11/10T/10T, using the pultrusion head described in FIG. 1.

FIG. 3 shows the pultrusion head including an in-line die, without dead space and with no system for separating fibers into different layers (according to S. Lecorre, LTN, Nantes, International Journal of Microstructure and Materials Properties January 2012) of example 3.

FIG. 4 shows the morphology of the impregnated fibrous material (pultruded profile) with the pultrusion head described in FIG. 3, with a reactive composition of type 11/10T/10T.

FIG. 5 shows the pultrusion head without dead space and with a system for separating the fibrous material into different layers, therefore circulating in its own channel of example 4 according to the invention.

FIG. 6 shows the morphology of a pultruded profile made with the pultrusion head described in FIG. 5 (example 4), with a reactive composition of type 11/6T/10T.

FIG. 7 shows the morphology of a profile made with the pultrusion head described in FIG. 5 (example 5), with a reactive composition of type BACT/10T.

EXAMPLES

The following examples provide a non-limiting illustration of the scope of the invention.

Example 1: Comparison

Preparation of an Impregnated Fibrous Material of 11/6T/10T by Nonreactive Pultrusion with Separation of the Fibers into Several Layers, but in a Single Impregnation Chamber The polymer is a 11/10T/10T with mass 10,000 g/mol. Its Tg is 115° C. and its viscosity at 300° C. is 70 Pa·s.

The method for manufacturing the composite plate is a pultrusion method with impregnation by melt route with a pultrusion head comprising a crosshead die.

The pultrusion head includes a resin tank in which the fibers are separated into 4 layers using a system of supporters, as described in FIG. 1.

This pultrusion head has significant dead spaces.

All of the fibrous reinforcement has a thickness of 1 mm. After separation, each of the layers of fibers has a thickness of about 250 µm.

The polymer is introduced in the form of granules, compounded beforehand with a heat stabilizing agent, in an extruder which supplies the crosshead die.

The temperature at which the fibers have been impregnated was 300° C.

The line speed was 0.5 m/m in.

The fiber used is the Hypertex glass fiber of 3B SE4535.

The fiber level was 60% by volume.

The obtained profile is a plate with a width of 200 mm and a thickness of 1 mm.

Result

The morphology of the obtained profile is indicated in FIG. 2: the impregnation of the fibers is excellent, but the line speed is low and cannot be accelerated if one wishes to preserve this impregnation quality, which makes this pultrusion method not very productive with this type of resin.

Furthermore, the relative low weight of the polymer used to limit its viscosity at 300° C., in light of its high Tg, prevents achieving very high properties at break. Thus, the bending stress at break remains below 1000 MPa, which is low, in light of the fiber level (See table 1). This is the result of an overly low molar mass of the resin, which was deliberately limited to 10,000 g/mol so as to have a fluid enough polymer to be compatible with the nonreactive method at 300° C.

Furthermore, it can be seen in FIG. 3 that this low molar mass leads to micro-cracking of the pultruded profile under the effect of residual stresses that appear during the crystallization of the resin and the cooling of the pultruded profile.

Example 2: Comparison

Preparation of an Impregnated Fibrous Material of 11/6T/10T by Reactive Pultrusion with Separation of the Fibers into Several Layers, but in a Single Impregnation Chamber The same pultrusion head as in example 1 is used, but with a reactive composition made up of two reactive prepolymers of type 11/6T/10T, with molar mass Mn of 2500 g/mol, having a melt viscosity at 300° C. of 1 Pa·s, one terminating diCOOH, the other diNH2. After polymerization, the resin has a Tg of 115° C.

The prepolymers are melted separately using 2 extruders.

The prepolymers are introduced in granule form, into an extruder that supplies the crosshead die.

The temperature at which the fibers have been impregnated was 300° C.

The line speed was 0.8 m/m in.

The fiber used is the Hypertex glass fiber of 3B SE4535.

The fiber level was 58% by volume.

The obtained profile is a plate with a width of 200 mm and a thickness of 1 mm.

The start protocol for the pultrusion head consists in using a single prepolymer to impregnate the fibers, until achieving a stabilized regime on the line. The second prepolymer is then introduced, which is mixed at 300° C. with the first prepolymer, using a Sulzer-type static mixer, just before they are introduced into the pultrusion head.

In this pultrusion head, the fibers are separated into 4 layers, like in example 1. All of the fibrous reinforcement has a thickness of 1 mm. After separation, each of the layers of fibers has a thickness of about 250 µm.

Result

The impregnation of the fibers is excellent but the production of the profile stops shortly after startup, since the fibers become blocked in the head. This is due to the presence of excessive dead spaces in the pultrusion head, in which the reactive composition resides for too long and therefore polymerizes, leading to very significant viscosification of the resin and blocking of the fibers in around ten minutes, that is to say, for a time close to the polymerization time of the reactive composition and the time needed to replace in the dead zones, the initial prepolymer with the reactive composition. This method is therefore not robust and therefore not viable.

Example 3: Comparison

Preparation of a Fibrous Material Impregnated with 11/6T/10T by Reactive Pultrusion without Separation of Layers The pultrusion head used is shown in FIG. 3, is similar to the design of the pultrusion head described in the work by Prof. Steven Lecorre at the LTN, in Nantes, International Journal of Microstructure and Materials Properties January 2012). This pultrusion head stands out by the fact that the fibers take up a volume close to the volume of the head, that is to say, there is no significant dead space. However, there is no separation of the fibers into several layers, whereas the thickness of the final profile is 1 mm. The fiber level is 60% by volume. The thickness of the fibrous reinforcement is 1 mm before impregnation, and the thickness of the air gap of the pultrusion head is 2.5 mm. The pultrusion speed is 0.8 m/min.

The reactive composition used is made up of two reactive prepolymers of type 11/6T/10T, with a mass of 2500 g/mol, and having a melt viscosity at 300° C. of 1 Pa·s, one terminating diCOOH, the other diNH2. After polymerization, the resin has a Tg of 115° C.

The prepolymers are melted separately using 2 extruders.

The prepolymers are introduced in granule form, into an extruder that supplies the crosshead die.

The temperature at which the fibers have been impregnated was 300° C.

The line speed was 0.8 m/m in.

The fiber used is the Hypertex glass fiber of 3B SE4535.

The fiber level was 59% by volume.

The obtained profile is a plate with a width of 200 mm and a thickness of 1 mm.

The start protocol for the pultrusion head consists in using a single prepolymer to impregnate the fibers, until achieving a stabilized regime on the line. The second prepolymer is then introduced, which is mixed at 300° C. with the first prepolymer, using a Sulzer-type static mixer, just before they are introduced into the pultrusion head.

Result:

The absence of excessive dead spaces in the pultrusion head allows the pultrusion method to continue for at least 2 hours without blockage, whereas the complete reaction time of the reactive composition at 300° C. is less than 5 min. However, the absence of separation into layers of the fibrous reinforcement does not allow good impregnation of the fibers, despite the low viscosity of the prepolymers used (See FIG. 4).

This method is therefore not compatible with reactive chemistry based on polymers with a high Tg.

Example 4: Invention

Preparation of a Fibrous Material Impregnated with 11/6T/10T by Reactive Pultrusion with Separation of Layers The pultrusion head used is shown in FIG. 5. This pultrusion head stands out by the fact that the fibers take up a volume close to the volume of the head, that is to say, there is no significant dead space. Furthermore, the fibers are separated into several layers, whereas the thickness of the final profile is 1 mm. The fiber level is 60% by volume. Thus, the total thickness of the fibrous reinforcement is 1 mm before impregnation and in the absence of tension, the thickness of the air gap of each channel used for each of the layers is 350 μm, while each of the layers of fibers, under tension, has a thickness close to 250 μm.

The pultrusion speed is 1.5 m/min.

The reactive composition used is made up of two reactive prepolymers of type 11/6T/10T, with a mass of 2500 g/mol, and having a melt viscosity at 300° C. of 1 Pa·s, one terminating diCOOH, the other diNH2. After polymerization, the resin has a Tg of 115° C.

The prepolymers are melted separately using 2 extruders.

The prepolymers are introduced in granule form, into an extruder that supplies the crosshead die.

The temperature at which the fibers have been impregnated was 300° C.

The line speed was 1.5 m/m in.

The fiber used is the Hypertex glass fiber of 3B SE4535.

The fiber level was 57% by volume.

The obtained profile is a plate with a width of 200 mm and a thickness of 1 mm.

The start protocol for the pultrusion head consists in using a single prepolymer to impregnate the fibers, until achieving a stabilized regime on the line. The second prepolymer is then introduced, which is mixed at 300° C. with the first prepolymer, using a Sulzer-type static mixer, just before they are introduced into the pultrusion head.

At the outlet of the pultrusion head, 3 IR furnaces of 2 m were arranged in line that allow post-polymerization of the melt resin, at a temperature of 300° C. In light of the line speed of 1.5 m/min, the polymerization time was 4 min. The final shaping of the plate is done using a cold forming machine, set at 200° C., placed at the outlet of the last polymerization furnace.

Results:

The absence of excessive dead spaces in the pultrusion head allows the pultrusion method to continue for at least two hours without blockage, whereas the complete reaction time of the reactive composition at 300° C. is less than 5 min. The separation of the fibrous reinforcement into layers allows good impregnation of the fibers (See FIG. 6). Furthermore, the low viscosity of the prepolymers used further allows a pultrusion speed of 1.5 m/m in, which is a productivity factor of this method.

The collection of a plate sample directly at the outlet of the pultrusion die made it possible to measure the molar mass of the resin in this step of the method, and the Mn found was 5200 g/mol (measurement done by NMR), which confirms that the polymerization in the pultrusion head is very partial, which equally limits the risks of overpressure and damage to the fibers, or even of complete blockage of the pultrusion head.

Using a reactive method makes it possible, after the post-polymerization step and the passage in the last cold forming machine, to obtain a composite having excellent mechanical properties: in this case, a measurement is done, according to ISO standard 14125:1998, of a bending stress at break >1000 MPa (See Table 1). This reflects the fact that a high molar mass was reached in the pultruded profile, and this is also accompanied by the disappearance of the microcracks (FIG. 6) that were present in the profile made with the nonreactive method (FIG. 3).

Furthermore, using reactive chemistry made it possible to impregnate the fibers at high speed (i.e. beyond 1 m/m in) at a relatively low temperature (i.e. 300° C.). As a comparison and to clearly show the interest of the invention, a polymer of mass equivalent to the mass obtained after post-polymerization would have had to be heated to more than 360° C. in order to be fluid enough to allow impregnation of the fibers using a nonreactive method. It would further have been necessary to have very effective heat stabilization to avoid its degradation, which remains complicated with PPA. To finish, the cost of the pultrusion equipment increases greatly beyond 330° C.

This reactive method is therefore compatible with reactive chemistry based on polymers with a high Tg.

Example 5: Invention

Preparation of a Fibrous Material Impregnated with BACT/10T by Reactive Pultrusion with Separation of Layers The pultrusion head used is shown in FIG. 5. This pultrusion head stands out by the fact that the fibers take up a volume close to the volume of the head, that is to say, there is no significant dead space. Furthermore, the fibers are separated into several layers, whereas the thickness of the final profile is 1 mm. The fiber level was 60% by volume. Thus, the total thickness of the fibrous reinforcement is 1.2 mm before impregnation and in the absence of tension, the thickness of the air gap of each channel used for each of the layers is 350 µm, while each of the layers of fibers, under tension, has a thickness close to 250 µm.

The pultrusion speed is 1.5 m/m in.

The reactive composition used is made up of two reactive prepolymers of type BACT/10T, with a mass of 2800 g/mol, and having a melt viscosity at 320° C. of 4 Pa·s, one terminating diCOOH, the other diNH2. After polymerization, the resin has a Tg of 140° C.

The prepolymers are melted separately using 2 extruders.

The prepolymers are introduced in granule form, into an extruder that supplies the crosshead die.

The temperature at which the fibers have been impregnated was 320° C.

The line speed was 1.5 m/m in.

The fiber used is the Hypertex glass fiber of 3B SE4535.

The fiber level was 58% by volume.

The obtained profile is a plate with a width of 200 mm and a thickness of 1 mm.

The start protocol for the pultrusion head consists in using a single prepolymer to impregnate the fibers, until achieving a stabilized regime on the line. The second prepolymer is then introduced, which is mixed at 320° C. with the first prepolymer, using a Sulzer-type static mixer, just before they are introduced into the pultrusion head.

At the outlet of the pultrusion head, 3 IR furnaces of 2 m were arranged in line that allow post-polymerization of the melt resin, at a temperature of 320° C. In light of the line speed of 1.5 m/m in, the polymerization time was 4 min. The final shaping of the plate is done using a cold forming machine, set at 200° C., placed at the outlet of the last polymerization furnace.

Results:

The absence of excessive dead spaces in the pultrusion head allows the pultrusion method to continue for at least two hours without blockage, whereas the complete reaction time of the reactive composition at 320° C. is less than 5 min. The separation of the fibrous reinforcement into layers allows good impregnation of the fibers (See FIG. 7). Furthermore, the low viscosity of the prepolymers used further allows a pultrusion speed of 1.5 m/m in, which is a productivity factor for this method.

The collection of a plate sample directly at the outlet of the pultrusion die made it possible to measure the molar mass of the resin in this step of the method, and the Mn found was 6200 g/mol (measurement done by NMR), which confirms that the polymerization in the pultrusion head is very partial, which equally limits the risks of overpressure and damage to the fibers, or even of complete blockage of the pultrusion head.

Using a reactive method makes it possible, after the post-polymerization step and the passage in the last cold forming machine, to obtain a composite having excellent mechanical properties: in this case, a measurement is done, according to ISO standard 14125:1998, of a bending stress at break >1000 MPa (See Table 1).

Furthermore, using reactive chemistry made it possible to impregnate the fibers at high speed (that is to say, beyond 1 m/m in) at a relatively low temperature (that is to say, 320° C.). As a comparison and to clearly show the interest of the invention, a polymer of mass equivalent to the mass obtained after post-polymerization would have had to be heated to more than 360° C. in order to be fluid enough to allow impregnation of the fibers using a nonreactive method. It would further have been necessary to have very effective heat stabilization to avoid its degradation, which remains complicated with PPA. To finish, the cost of the pultrusion equipment increases greatly beyond 330° C.

This reactive method is therefore compatible with reactive chemistry based on polymers with a high Tg.

TABLE 1

| | Fiber level (% vol) | Bending stress at break (MPa) |
| --- | --- | --- |
| Example 1 | 60 | 940 |
| Example 2 | 58 | X (not tested, excessive porosity) |
| Example 3 | 59 | X (not tested, excessive porosity) |
| Example 4 | 57 | 1350 |
| Example 5 | 58 | 1410 |

Example 5: Determination of the Porosity Level the Relative Deviation Between Theoretical Density and Experimental Density (General Method)

a) The required data are:
  The density of the thermoplastic matrix
  The density of the fibers
  The grammage of the reinforcement:
linear mass (g/m) for example for a ¼ inch tape (coming from a single strand) surface density (g/m²) for example for a wider tape or a fabric b) Measurements to be carried out:
The number of samples must be at least 30 in order for the result to be representative of the studied material.
The measurements to be carried out are:
  The size of the samples taken:
Length (if linear mass is known).
Length and width (if surface density is known).
  The experimental density of the samples taken:
Mass measurements in the air and in water.
  The fiber level is measured according to ISO 1172:1999 or by thermogravimetric analysis (TGA) as determined for example in the document B. Benzler, Applikationslabor, Mettler Toledo, Giesen, UserCom January 2001.
The measurement of the carbon fiber level can be determined according to ISO 14127:2008.
Determination of the theoretical mass fiber level:
a) Determination of the theoretical content by mass of fibers:

$$\%Mf_{th} = \frac{m_l \cdot L}{Me_{air}}$$

With
ml the linear mass of the tape,
L the length of the sample, and
Meair the mass of the sample measured in the air.

The variation of the content by mass of fibers is presumed to be directly related to a variation of the matrix level without taking into account the variation of the quantity of fibers in the reinforcement.

b) Determination of the theoretical density:

$$d_{th} = \frac{1}{\frac{1-\%Mf_{th}}{d_m} + \frac{\%Mf_{th}}{d_f}}$$

With dm and df the respective densities of the matrix and the fibers.

The theoretical density thus calculated is the accessible density if there is no porosity in the samples.

c) Evaluation of the porosity:

The porosity then is the relative deviation between theoretical density and experimental density.

The invention claimed is:

1. A method for manufacturing at least one impregnated fibrous material comprising a fibrous material made of continuous fibers and a thermoplastic polymer having a glass transition temperature Tg more than or equal to 40° C., or a melting temperature Tm less than or equal to 400° C., the glass transition temperature Tg and the melting temperature Tm being measured by DSC according to standard ISO 11357-2:2013 and ISO 11357-3:2013, respectively,
   wherein said method comprises a step of impregnating, in a pultrusion head, said fibrous material by injecting a reactive composition in the melt state comprising at least one precursor of said thermoplastic polymer in the presence of said fibrous material,
   said fibrous material being, when it enters said pultrusion head, divided in its thickness into n layers, n being from 2 to 20,
   each layer circulating in said pultrusion head in a channel that is specific to it,
   said reactive composition being injected in each channel and/or between said layers when they are recombined at the exit from each channel,
   said channel being heated to a temperature such that the reactive composition has an initial melt viscosity of less than 50 Pa·s, the melt viscosity being measured by oscillatory rheology at a temperature Tm≤T≤Tm+50° C. for a semi-crystalline polymer or Tg≤T≤Tg+220° C. for an amorphous polymer, at 10 rad/see under nitrogen flushing with 5% deformation on a rheometer apparatus between two parallel planes 25 mm in diameter, the impregnation starting at the moment of injection and ending before or after said layers are recombined by superposition to form said at least one impregnated fibrous material, in which said at least one precursor of said thermoplastic polymer is at least partly polymerized.

2. The method according to claim 1, wherein the maximum thickness e of each layer is such that the impregnation time of each layer is less than or equal to the time required to increase the number-average molecular weight (Mn), determined by size exclusion chromatography or by NMR, of the reactive composition in said layer by a factor of 5.

3. The method according to claim 1, wherein the mean residence time of the reactive composition in the pultrusion head is at most equal to 3 times the residence time of said fibrous material.

4. The method according to claim 1, wherein the channels are cylindrical in shape.

5. The method according to claim 4, wherein the channels are cylindrical in shape, each channel having a thickness proportional to the thickness of each n layer, the thickness of each channel is between 2 and 3 times the thickness of each n layer.

6. The method according to claim 1, wherein each channel is fitted with at least one contact zone having a radius of curvature of greater than d/breaking eps (d/E), d being the diameter of the fibers of the fibrous material and eps being the deformation at break of the fibers, placed alternately above or below the fibrous material during the travel of the fibrous material in an impregnation head in order to cause and/or maintain spreading of the fibrous material, optionally initiated beforehand upstream of the impregnation head, without damaging said fibrous material.

7. The method according to claim 1, wherein each channel is devoid of contact zones placed alternately above or below the fibrous material during the travel of the fibrous material in an impregnation head.

8. The method according to claim 1, wherein said reactive composition is injected between two layers, in pairs, at the outlet of said channels, said two layers then being impregnated in order to form an impregnated bilayer material, each impregnated bilayer material subsequently being assembled in its thickness with others in order to form said at least one impregnated fibrous material.

9. The method according to claim 1, wherein said thermoplastic polymer is a reactive pre-polymer capable of reacting with itself or with another pre-polymer, based on the chain ends borne by said reactive pre-polymer, or else with a chain extender.

10. The method according to claim 1, wherein said thermoplastic polymer is selected from: polyaryl ether ketones (PAEK); polyaryl sulfones; polyarylsulfides; polyamides (PA); PEBAs, polyacrylates; polyolefins; and mixtures thereof.

11. The method according to claim 1, wherein said thermoplastic polymer is selected from polyamides, PVDF, PEEK, PEKK, PEI and a PEKK and PEI mixture.

12. The method according to claim 1, wherein a fiber level in said at least one impregnated fibrous material is from 45 to 80% by volume.

13. The method according to claim 1, wherein a porosity level in a pre-impregnated fibrous material is less than 10%.

14. The method according to claim 1, wherein it further comprises a step of shaping parallel strand(s) of said at least one impregnated fibrous material, by means of at least one calender or a heating or cooling forming machine, in the form of a single unidirectional ribbon or a plurality of parallel ribbons, or in the form of a U-shaped or T-shaped profiled element or in the form of a ring or of a plurality of parallel unidirectional ribbon rings, said heating or cooling forming machine being or not being in contact with an impregnation head.

15. The method according to claim 14, wherein the shaping step is carried out using a plurality of heating or cooling calenders, or heating or cooling forming machines, mounted in parallel and/or in series with respect to the direction of passage of the parallel strands.

16. The method according to claim 14, wherein the a plurality of heating or cooling calenders comprise a heating calender, wherein said heating calender comprise an integrated induction or microwave heating system, coupled with the presence of carbon-based fillers in said thermoplastic polymer.

17. The method according to claim 1, wherein a belt press is present between the pultrusion head and a calender.

18. The method according to claim 1, wherein a series of post-polymerization furnaces is present between the pultrusion head and a last forming machine or a last calender.

19. The method according to claim 1, wherein said thermoplastic polymer further comprises carbon-based fillers.

20. The method according to claim 1, wherein said fibrous material comprises continuous fibers selected from carbon, glass, silicon carbide, basalt-based or silica fibers, natural fibers, amorphous thermoplastic fibers where (a) when the thermoplastic polymer is amorphous, the amorphous thermoplastic fibers have a glass transition temperature Tg greater than the Tg of said thermoplastic polymer or (b) when the thermoplastic polymer is semi-crystalline, the amorphous thermoplastic fibers have a Tg greater than a melting temperature Tm of said thermoplastic polymer, semi-crystalline thermoplastic fibers wherein (a) when the thermoplastic polymer is amorphous, the semi-crystalline thermoplastic fibers have Tm greater than the Tg of said thermoplastic polymer or (b) when the thermoplastic polymer is semi-crystalline, the semi-crystalline thermoplastic fibers have a Tm greater than the Tm of said thermoplastic polymer, or a mixture of two or several of said continuous fibers.

* * * * *